United States Patent [19]
Olarig et al.

[11] Patent Number: 6,134,638
[45] Date of Patent: Oct. 17, 2000

[54] MEMORY CONTROLLER SUPPORTING DRAM CIRCUITS WITH DIFFERENT OPERATING SPEEDS

[75] Inventors: S. Paul Olarig, Cypress; Christopher J. Pettey, Houston, both of Tex.

[73] Assignee: Compaq Computer Corporation, Houston, Tex.

[21] Appl. No.: 08/910,847

[22] Filed: Aug. 13, 1997

[51] Int. Cl.[7] .......................... G06F 13/16; G06F 13/368
[52] U.S. Cl. ............................ 711/167; 710/52; 710/112; 710/58; 710/60
[58] Field of Search ........................... 711/167; 395/872, 395/878, 881, 858, 859, 851, 849, 880; 365/230.01, 230.03; 710/112

[56] References Cited

U.S. PATENT DOCUMENTS

| | | | |
|---|---|---|---|
| 4,233,390 | 11/1980 | Bowers et al. | 430/156 |
| 4,405,908 | 9/1983 | Soneda | 333/165 |
| 5,386,539 | 1/1995 | Nishi . | |
| 5,448,715 | 9/1995 | Lelm et al. . | |
| 5,495,435 | 2/1996 | Sugahara | 365/52 |
| 5,630,096 | 5/1997 | Zuravleff et al. . | |
| 5,771,199 | 6/1998 | Lee | 365/230.03 |

OTHER PUBLICATIONS

System Logic Products/IC Designs, ICD2023 PC Motherboard Clock Generator, 1 page, Kirkland, Wa.
LSI Logic, Phase–Locked Loops: G10™–p Cel–Based, 605K, 600 K, and 500K Technologies, Aug. 1996, 40 pages.

*Primary Examiner*—B. James Peikari
*Attorney, Agent, or Firm*—Conley, Rose & Tayon, P.C.; Michael F. Heim; Jonathan M. Harris

[57] ABSTRACT

A computer system including synchronous dynamic random access memory (SDRAM) circuits that are capable of operating at different frequencies. A memory controller generates multiple clock signals with appropriate frequencies for use by the SDRAM memory devices. Asynchronous data queues are used to provide data transfers between the SDRAM memory and the processor or other bus master devices residing on a peripheral bus. Upon initialization, the computer system determines the type of SDRAM devices present and provides status information to the memory controller which, in response, generates appropriate clock signals to the SDRAM memory circuits.

37 Claims, 6 Drawing Sheets

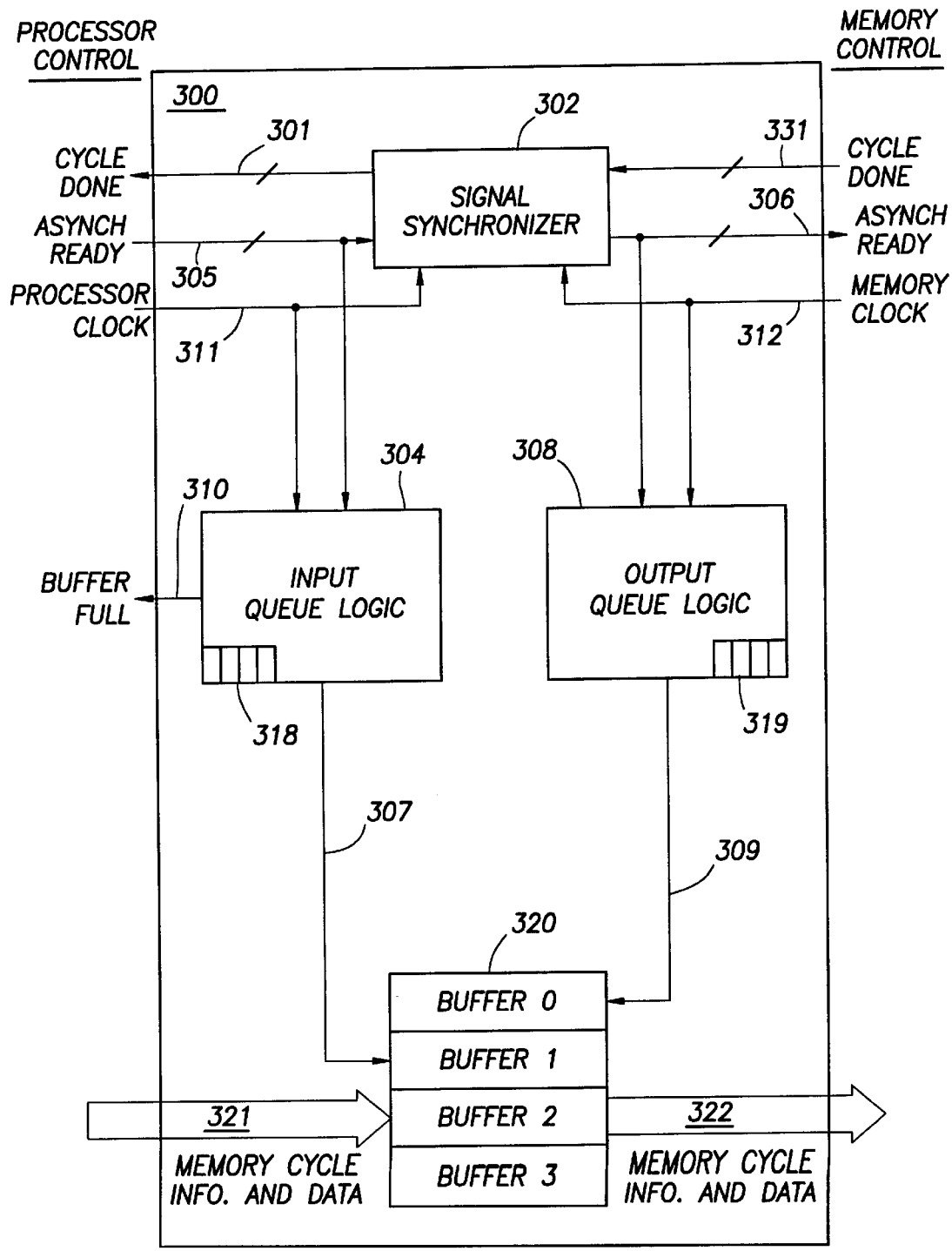

MEMORY CONTROLLER SUPPORTING DRAM CIRCUITS WITH DIFFERENT OPERATING SPEEDS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1 Field of the Invention

The present invention relates generally to a computer system including a system memory comprised of a dynamic random access memory (DRAM) array. More particularly, the invention relates to a memory controller for controlling data transfers between computer components and dynamic random access memory. Still more particularly, the invention relates to a memory controller capable of supporting different speed DRAM devices within a memory array.

2. Background of the Invention

Personal computers typically include dynamic random access memory ("DRAM") chips, commonly referred to as system memory. DRAM memory operates asynchronously meaning read and write requests do not necessarily coincide with a clock signal. Further, DRAM memory must be refreshed periodically to maintain the data stored in the chip. Normally, system memory includes banks of DRAM devices. Each memory bank may include as many as eight or nine memory chips. The number of banks provided in a computer system varies, but a typical range is between one and eight banks.

According to normal convention, the DRAM banks comprise the working memory of the system processor. The DRAM array connects to the memory controller via a memory bus, comprised of memory address lines, memory data lines, and various control lines. Data generally is transferred between the DRAM array and other components in two steps. First, the accessing component generates signals on the address lines representing the row address of the desired memory location, which are latched into the DRAM when the row address strobe (RAS) signal is asserted. At the next, or at subsequent, clock cycles, the DRAM latches in the column address signals when the column address strobe (CAS) signal is asserted. After the memory address has been determined, the memory array latches in data or drives out data, depending upon the status of the read/write (R/W) control signal.

The speed of memory devices is based upon certain timing parameters. These parameters require a certain period of to perform a memory operation. Because of these timing parameters, memory constructed with DRAM circuits is not always capable of responding to memory accesses within the time period allotted by the processor. In this event, external circuitry must signal to the processor that supplementary processor cycles, or wait states, are necessary before the data is ready on the data bus, or before data on the data bus can be stored in memory. In addition to slowing the system processor, wait states typically require use of the CPU host bus, thereby limiting use of that bus by other system components.

Recently, memory device manufacturers have introduced synchronous DRAM ("DRAM") to alleviate the memory bottleneck that occurs using conventional DRAM devices. Synchronous DRAM devices require a clock signal as a control input signal. SDRAM devices, like DRAM chips, are commonly organized into memory banks in an array. Many computer systems available today permit as many as eight bank in the memory array. The SDRAM device derives its name from the fact that all of the input signals (or commands) are accepted by the DRAM device on the rising edge of the clock signal, and thus are "synchronized" with the clock signal. The clock signal also allows data pipelining within the memory array and permits data to be output in a continuous stream.

SDRAM devices currently are available in different speeds (which typically is measured in units of frequency, such as megahertz which indicate the number of cycles per second for the device). Today, SDRAM devices are available as 66 MHz or 100 MHz devices, although higher speeds are anticipated. The price of SDRAM devices generally are dependent on frequency, with higher speed devices costing more.

The transfer and timing of address, data and control signals between a processor and a DRAM device is controlled by a memory controller. Memory controllers control transactions between the system memory and other components in the computer system, including the central processing unit. In some computer systems, the memory controller couples to a peripheral component interconnect ("PCI") bus to permit masters on the PCI bus to run cycles to the system memory. In accordance with normal convention, memory control units provide a clock signal to each bank in the SDRAM memory array. Often, because of loading problems and other concerns, memory controllers provide two separate output clock signals to clock up to eight memory banks, which each clock signal connected to up to four memory banks.

As faster microprocessors become available and implemented in computer designs, memory devices must operate faster to minimize processor wait states and to maintain compatibility with the processors. Because of the cost of memory devices, consumers prefer to salvage memory devices from old computers and re-use these memory devices in new computer systems. However, the use of faster processors in the new computer systems typically preclude the use of older, slower memory. Thus, as computer manufacturers offer faster computer systems, computer owners are unable to re-use memory devices from older computers. In large computer systems, such as file servers, the expenditure on system memory represents a substantial investment.

It would be advantageous to develop a computer system that is capable of using older memory devices when upgrading to a new computer system. At least one option has been suggested to accomplish this goal. That option is to run the computer system at the speed of the slowest memory device. Although faster memory devices will operate at the slower speed, the overall computer performance is compromised because data communications with the memory array are performed at a speed less than that at which the faster memory devices can operate.

It would thus be desirable to provide a computer system that is capable of implementing memory devices with different operating speeds. It would also be desirable if the computer system could optimize the performance of each memory device by performing transactions at the fastest possible speed with each memory circuit. By performing transactions at the maximum speed of each memory device, overall computer performance would be increased.

Despite the apparent advantage of a computer system capable of operating with SDRAM devices of different speeds, to date no such system has been built.

BRIEF SUMMARY OF THE INVENTION

The problems outlined above are in large part solved by a computer system that includes a specially configured memory controller for controlling memory cycles to a plurality of banks of synchronous dynamic random access memory (SDRAM) devices. The SDRAM memory devices may operate at different frequencies appropriate for each SDRAM device and need not operate at the same frequency as the processor. In accordance with the preferred embodiment, a memory controller generates multiple clock signals with different frequencies for use by the different SDRAM memory devices.

The memory controller preferably includes asynchronous data queues to facilitate data transfers between the SDRAM memory array and either the processor or a master on the PCI bus or other system bus. Upon initialization, the computer system determines the type of SDRAM devices present in the memory array and provides that information to the memory controller which, in response, generates clock signals to the various SDRAM devices in the memory array. The frequencies of the clock signals provided by the memory controller are appropriate for the SDRAM devices in the computer system. According to a preferred embodiment, information stored in each SDRAM device identifies the type of memory circuit and is used to determine the type of SDRAM devices included in the computer system.

These and other advantages of the present invention will be apparent to one skilled in the art upon reading the following detail description of the invention.

BRIEF DESCRIPTION OF THE DRAWINGS

A better understanding of the present invention can be obtained when the following detailed description of the preferred embodiment is considered in conjunction with the following drawings, in which:

FIG. 3 is a block diagram illustrating in more detail the processor to memory data queue of FIG. 1;

DETAILED DESCRIPTION OF THE INVENTION

Figure 1:
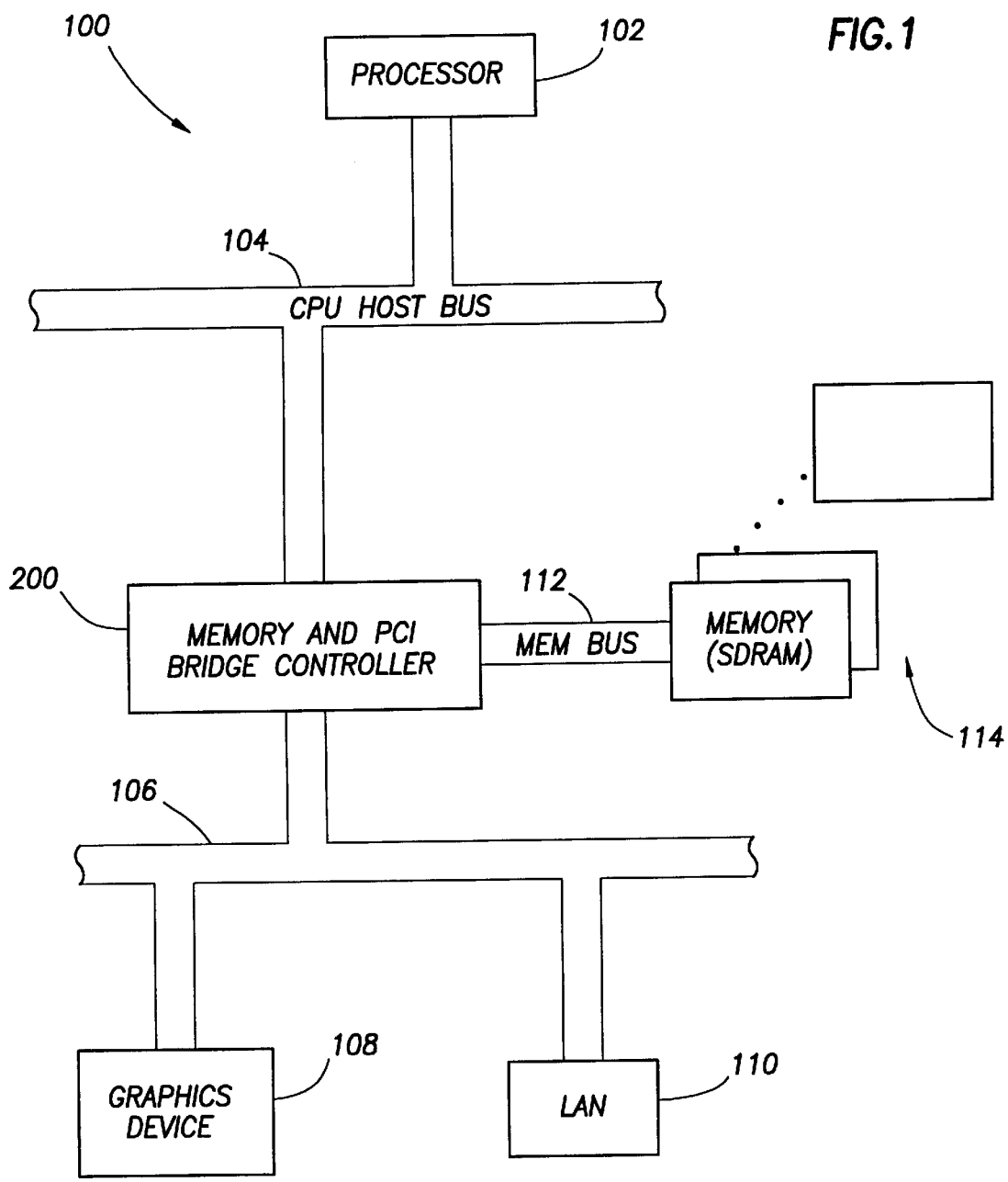
FIG. 1 is a block diagram of a computer system including a memory and PCI bridge controller, processor to memory, memory to processor data queues and memory clock generator consistent with the preferred embodiment.

Referring now to FIG. 1, the computer system 100 constructed in accordance with the preferred embodiment generally includes a processor 102 coupled to a memory and PCI bridge controller 200 through a CPU host bus 104. The memory and PCI bridge controller 200 includes a memory controller for orchestrating data transfers with the system memory array 114 via memory bus 112. The memory and PCI bridge controller 200 also function as a bus bridge to the peripheral component interconnect (PCI) bus 106. In accordance with normal convention, various devices can be coupled to the PCI bus 106, such as a graphics card 108, a local area network ("LAN") interface 110, or any other PCI bus device. Such PCI devices preferably operate in a mastership mode, according to known techniques, to write data to and read data from the memory array 114.

Processor 102 may include any microprocessor such as a Pentium® processor with MMX™ technology, Pentium II processor, K-6, or any other processor capable of being used in a personal computer. Moreover, while only one processor is shown, one skilled in the art will understand that multiple processors may be provided in the computer system. Similarly, the CPU host bus 104 and PCI bus 106 include bus architectures commonly used in personal computers.

The memory array 114 preferably comprises synchronous dynamic random access memory ("SDRAM") devices such as the μPD4516421 SDRAM manufactured by NEC Electronics, or any other SDRAM device. The memory array 114 may be organized in banks in accordance with normal convention. Each bank of SDRAM memory may have SDRAM devices with the same or different timing and speed characteristics. Further, the clock frequency of the SDRAM devices may be different than the frequency of the processor clock. The memory and PCI bridge controller 200 enables the computer system 100 to write data to and read data from the system memory array 114 even though the memory array may include a mix of different speed SDRAM devices. The implementation of a memory and PCI bridge controller 200 that can communicate with different speed SDRAM's makes it unnecessary to modify or specially design the processor 102 and the devices coupled to PCI bus 106 to communicate with multiple speed SDRAM devices.

Figure 2:
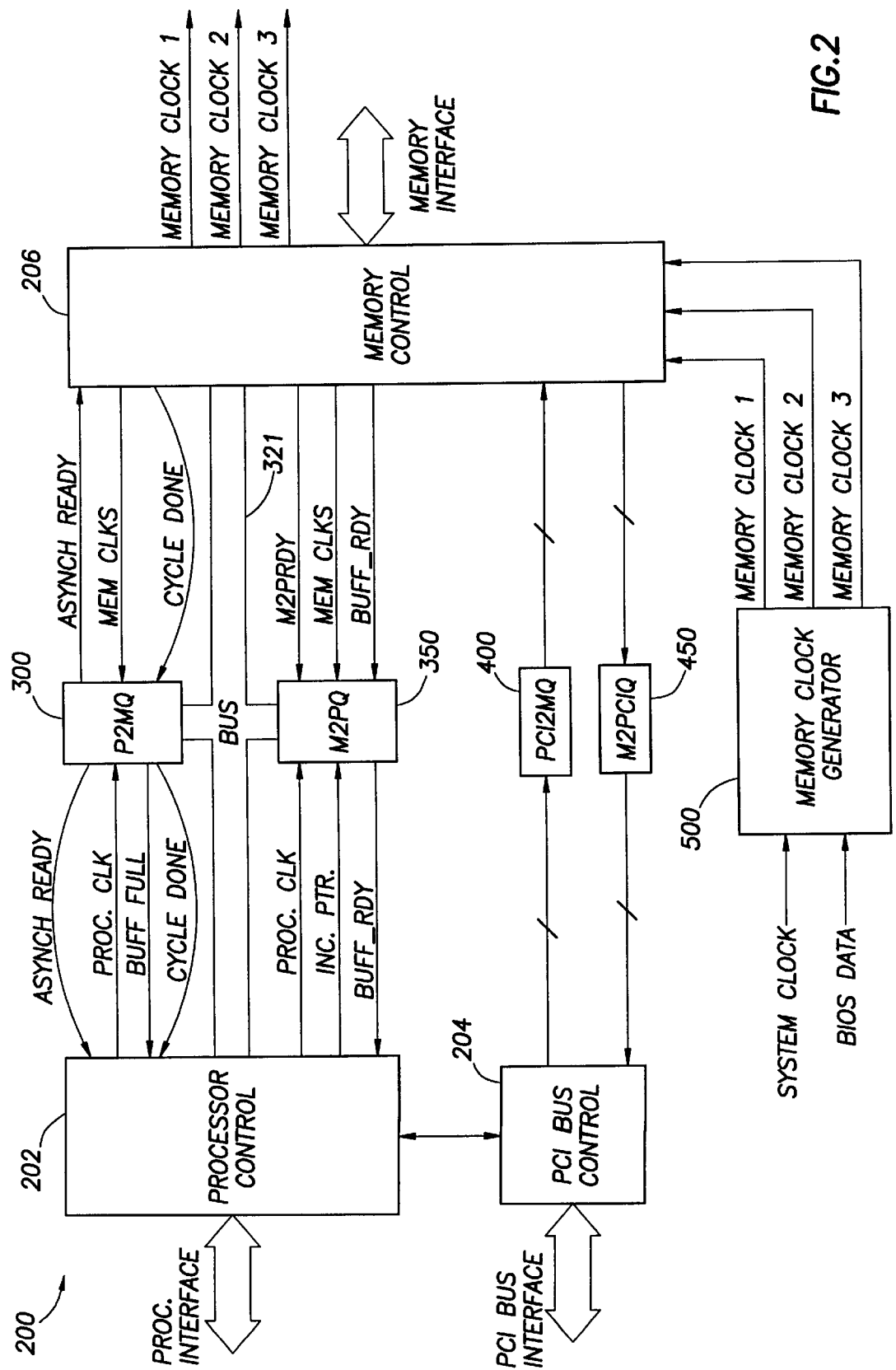
FIG. 2 is a block diagram of the memory and PCI bridge controller in accordance with the preferred embodiment of FIG. 1.

Referring now to FIGS. 1 and 2, the memory and PCI bridge controller 200 preferably includes a processor control interface unit 202, a PCI bus control interface 204, and a memory control unit 206. The processor control 202 provides logic for interfacing the controller 200 to system processor 102. Similarly, the PCI control 204 provides logic for interfacing the controller to PCI bus 106 and memory control 206 includes logic for interfacing controller 200 to the memory bus 112. Data and address signals are transferred between the processor control 202 and memory control 206 via processor-to-memory data queue (P2MQ) 300 and memory-to-processor data queue (M2PQ) 350. Data written to the memory array is temporarily stored in P2MQ 300 while data read from the memory array is temporarily stored in M2PQ 350. Similarly, data written to memory by PCI bus control 204 is buffered in PCI-to-memory queue (PCI2MQ) 400 and data read from memory by PCI control 204 is buffered in memory to PCI (M2PCIQ) queue 450.

Memory and PCI bridge controller 200 also includes a memory clock generator 500 for generating multiple memory clock signals. Three such clock signals are shown for purposes of illustration in FIG. 2 as memory clock 1, memory clock 2 and memory clock 3. Although memory clock generator 500 is shown as part of memory and PCI bridge controller 200, the memory clock generator 500 may alternatively be constructed as a separate component. As explained below, the memory clock signals are derived from the system clock (also referred to as the processor bus clock). The memory clock signals may include different frequencies and thus allow different speed SDRAM's to be used in computer system 100. Memory clock generator 500 is programmed to provide an appropriate clock frequency based on BIOS data provided as an input to the memory clock generator 500. The BIOS data identifies the type of SDRAMs included in each bank.

Because the SDRAM devices may operate at speeds that differ from processor 102, data flow between the memory array and the processor 102 and between the memory array 114 and PCI bus masters. Accordingly, computer system 100 preferably includes a set of data queues 300, 350, 400, 450 for each bank of SDRAM devices. Thus, although the memory and PCI bridge 200 in FIG. 2 is shown to include only data queues for one bank of SDRAM devices, the memory and PCI bridge 200 may include additional sets of data queues 300, 350, 400, 450 if additional SDRAM banks are included in the memory array 114. The operation of the data queues, as well as the memory clock generator 500 is explained in more detail below.

Processor to memory queue (P2MO)

Referring now to FIGS. 2 and 3, during a write cycle to memory from the system processor, data and address signals pass through the processor to memory queue P2MQ 300. As shown in FIG. 3, P2MQ 300 preferably includes input queue logic 304, output queue logic 308, queue write buffer 320, and signal synchronizer 302. In addition to data and address signals, the processor also preferably transmits certain control signals to the processor to memory queue P2MQ 300, including a processor clock signal and an asynch ready signal. The processor also receives two control signals from the P2MQ 200, including a cycle done signal and a buffer full signal. Similarly, the memory control provides a memory clock signal and a cycle done signal to the P2MQ 200. The P2MQ 200 provides an asynch ready control signal to the primary controller.

The processor control 202 transfers data, address and cycle information to the P2MQ 300 and bus 321. The cycle information generally includes such information as byte enables, write back bits, and burst bits and are used for reads and writes in accordance with known techniques. The queue write buffer 320 couples to bus 321, and preferably includes four buffers, buffer 0, buffer 1, buffer 2, and buffer 3. Each buffer in the queue write buffer 320 preferably is one cache line in width and thus may hold 32 bytes of data along with address and cycle information. It should be recognized, however, that queue write buffer 320 can include any number of buffers and each buffer may be any number of bits in width.

The input queue logic 304 determines which buffer in the queue write buffer 320 will receive the write data on bus 321. The input queue logic 304 provides an input queue pointer 307 to queue write buffer 320 that identifies which of the four buffers processor control 202 is to receive the data to be written. Thus, as buffer 0 becomes full, input queue pointer 307 increments to point to buffer 1, which then fills with data from processor control 202. Input queue logic 304 includes logic to determine when input queue pointer 307 must be incremented. When a buffer becomes full, processor control 202 asserts the asynch ready signal on line 305 which is provided as an input to input queue logic 304, as well as to signal synchronizer 302. One asynch ready signal is provided for each buffer 0–3. The asynch ready signal associated with a buffer is relayed to memory control 206 to indicate that the associated buffer contains data to be read by memory control 202. Upon detection of an asserted asynch ready signal, input queue logic 304 increments input queue pointer 307.

Input queue logic 304 also includes a register 318, which includes four status bits corresponding to each of the buffers in the queue write buffer 320. Each buffer status bit indicates whether the associated buffer has been read by memory control 206. As a buffer is provided with data by processor control 202, the corresponding buffer status bit in register 318 is set to indicate that data is present in the buffer, and the memory control 206 has not yet read data from that buffer. Each buffer status empty bit in register 318 is cleared when the memory control 206 reads data from the buffer associated with the buffer bit. By updating and monitoring the state of the buffer status bits in register 318, input queue logic 304 can determine when the queue write buffer 320 is full so that processor control 202 does not overwrite valid buffer data that has not yet been read by memory control 206. Upon detection of a full queue write buffer 320, input queue logic 304 asserts the buffer full signal on line 310 to notify processor control 202 of the buffer full condition. In response, the processor control 202 will not write additional data to queue write buffer 320 until memory control 206 has read data from one of buffers 0–3, thereby freeing a write buffer for new write data. Input queue logic 304 deasserts the buffer full signal when memory control 206 reads data from a previously full buffer.

Referring still to FIGS. 2 and 3, output queue logic 308 includes a register 319 and an output queue pointer 309. Register 319 includes a valid bit for each buffer in queue write buffer 320. Each buffer valid bit in register 319 identifies whether data is present in the associated buffer that has not been read by memory control 206. As data is written into a buffer by processor control 202, the asynch ready signal on line 305 is asserted by processor control 202. The asynch ready signal is also asserted on line 306 by signal synchronizer 302 and provided to memory control 206 and output queue logic 308. Output queue logic 308 uses the asynch ready signal to set the valid bit associated with the asynch ready signal to indicate that the buffer includes data to be read by memory control 206. Once memory control 206 has read the data from a buffer, the corresponding valid bit in register 320 is cleared to prevent memory control 206 from wrapping around and re-reading a buffer that has already been read. Thus, before or when a buffer is read, the state of that buffer's valid bit is ascertained to determine whether the buffer should be read.

Output queue pointer 309 identifies the buffer from which memory control 206 reads data. At reset, the input and output queue pointers points to the same buffer. When memory control 206 completes reading data from one of buffers 0–3, output queue logic 308 increments output queue pointer 309. Output queue pointer 309 thus points to the next buffer to be read by memory control 206. Once memory control 206 has completed reading data from one of buffers 0–3, the memory control asserts the cycle done signal on line 331 to the signal synchronizer 302. In the preferred embodiments, one cycle done signal is provided for each buffer in the queue write buffer 320. The cycle done signal also is asserted on line 301 by signal synchronizer 302 and provided to processor control 202 to indicate that the memory control 206 has read data from the buffer identified by the cycle done signal.

The present invention enables a processor to read data from and write data to one or more SDRAM banks in system memory, and also enables each SDRAM bank to operate at a clock frequency different from that of the processor clock. P2MQ 300 receives a processor clock signal on line 311 and a memory clock signal on line 312. Input queue logic 304 transfers data into the queue write buffer 320 using the processor clock signal. The signal synchronizer 302 and input queue logic 304 connect to line 311 to receive the processor clock signal. Similarly, the signal synchronizer 302 and output queue logic 308 connect to line 312 to receive the memory clock signal. The interface between the system processor and the processor to memory queue 300 occurs in the processor clock domain. The interface between the memory array and the processor to memory queue 300, however, occurs in the memory clock domain.

The memory clock is provided to the output queue logic 308 and data is read from queue write buffer 320 by memory control 206 using the memory clock signal. Because the data queue 300 interfaces with processor control 202 and memory control 206 using their respective clock signals, the processor 102 can write data to SDRAM circuits that operate at frequencies that differ from processor 102.

Signal Synchronizer

In addition to providing data buffers to allow for clock asynchronism between processor control 202 and memory control 206, P2MQ 300 also includes signal synchronizer 302 which functions to synchronize the two different clock domains (processor clock and memory clock). Referring still to FIGS. 2 and 3, signal synchronizer 302 preferably synchronizes the asynch ready signals and the cycle done signals. Synchronizer 302 insures that a signal asserted in the processor clock domain can be accurately detected by memory control 206 operating in the memory clock domain, and that a signal asserted in the memory clock domain can be accurately detected by processor control 202.

Figure 4A:
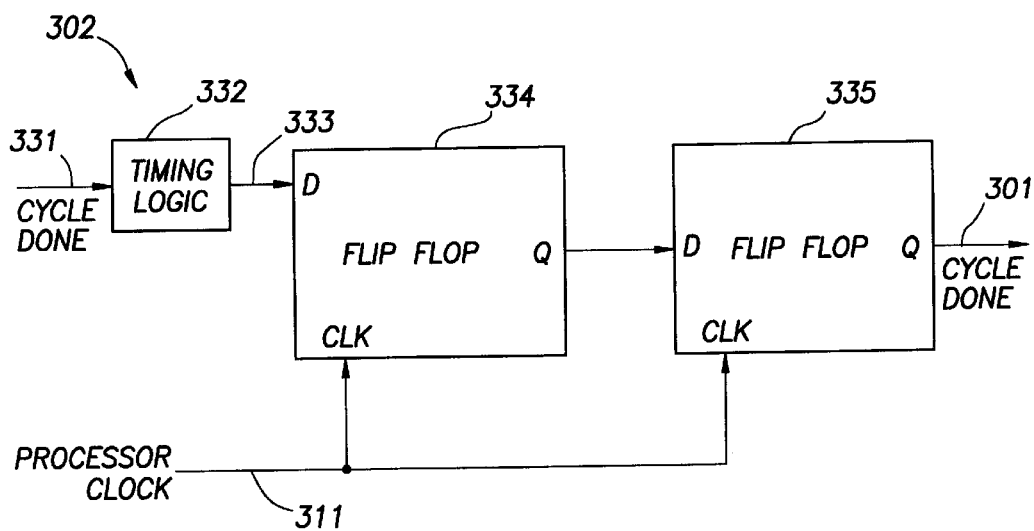
FIG. 4A shows a dual flip flop circuit for converting a signal between two clock domains.

Synchronism preferably is accomplished by stretching a signal so that it is asserted for additional clock pulses. Referring now to FIGS. 3 and 4A, signal synchronizer 302 preferably includes timing logic 332 and two flip flops 334 and 335 that are serially connected. Flip flops 334, 335 preferably comprise D-type latches, but other devices can be used as well. The circuit in FIG. 4A is shown for synchronizing the cycle done signal on line 331 to the processor clock, with the understanding that comparable circuitry preferably is used to synchronize other signals, such as the asynch ready signal.

Figure 4B:
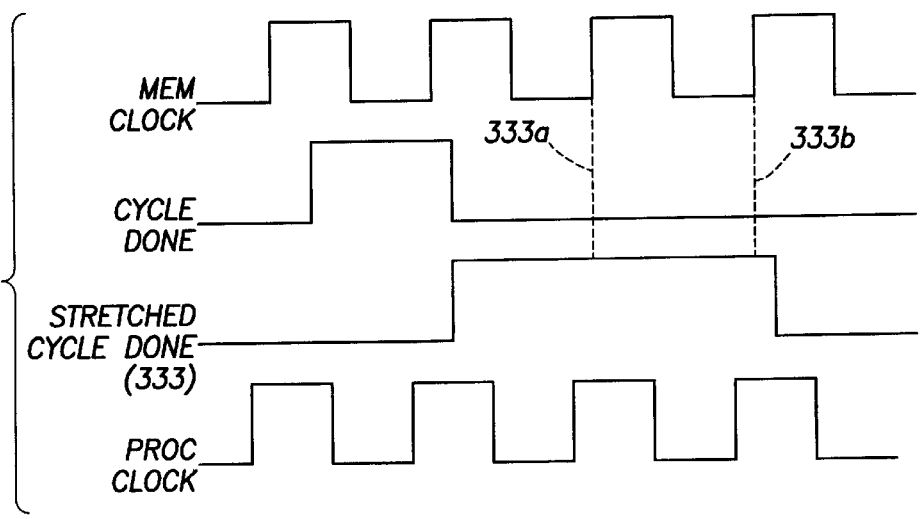
FIG. 4B is a timing diagram of the dual flip flop circuit of FIG. 4A.

The timing diagram in FIG. 4B demonstrates the timing of the timing logic circuit 332 of FIG. 4A. Referring now to FIGS. 2, 4A and 4B, the cycle done signal is asserted by memory control 206 in the memory clock domain and timing logic 332 stretches the cycle done signal to include two memory clock rising edges as indicated by the dashed lines 333a, 333b in FIG. 4B. This stretching is necessary to insure the cycle done signal will be of sufficient time duration to be detected by processor control 202. The stretched cycle done signal on line 333 is clocked through flip flops 334 and 335 and is provided as an output signal on line 301 to processor control 202. Flip flops 334, 335 are both clocked using processor clock 311. In the preferred embodiment, flip flops 334, 335 are clocked using rising clock edges, although falling edge triggered flip flops could also be used.

Thus, after the cycle done signal is asserted by memory control 206 and stretched by timing logic 332, flip flop 334 is clocked by a rising edge of the processor clock on line 311. The stretched cycle done signal then is clocked through flip flop 335 on the next rising edge of the processor clock. The use of two sequentially clocked flip flops avoids setup and hold timing problems that might otherwise occur if the cycle done signal (which originally is asserted in the memory clock domain) is not asserted long enough for a flip flop (which is clocked in the processor clock domain) to latch the signal onto its output pin. Thus, if only a single flip flop is used, that flip flop might enter a metastable state. The use of dual-clocked flip flops avoids this problem.

It should be recognized that if the stretched cycle done signal has a period of two memory clock cycles, then the period of the processor clock must be no greater than twice the period of the memory clock signal, minus the setup and hold times of the flip flops. That is, $$\text{Processor clock} \leq 2 \text{ (memory clock period)} - \text{flip flop setup and hold time} \quad (1)$$

For example, a 100 MHz memory clock has a period of $1/(100\times10^6)$ or 10 nanoseconds (ns). If the sample and hold time of the flip flops is 2 nanoseconds, then the processor clock period must be no greater than 2(10ns)−2ns=18ns. A period of 18ns corresponds to a processor clock frequency of $1/18\times10^{-9}$ or 55.6 MHz. Thus, although memory and PCI bridge 200 allows processor 102 and PCI master devices 108, 110 to communicate with SDRAM devices operating at different frequencies, equation (1) dictates the lower limit for the frequency of processor clock signal.

The circuit of FIG. 4A is also used to synchronize the asynch ready signal in the processor clock domain with the memory clock domain. Instead of clocking flip flops 334, 335 with the processor clock, however, the memory clock is used. In this case, the period of the memory clock must be:

$$\text{Memory clock} \leq 2 \text{ (processor clock period)} - \text{flip flop setup and hold time} \quad (2)$$

When synchronizing signals to the PCI bus, equations (1) and (2) are used except the factor of 2 is replaced with a factor of 4.

In the event that the processor clock and the memory clock are in phase, the asynch ready and cycle done signals need not be synchronized by synchronizer 302. In that case the asynch ready and cycle done signals bypass the synchronizer. The processor and memory clocks are in phase when their rising edges align which may occur when the frequency of the clocks are the same or when the frequency of one clock signal is an integer multiple of the frequency of the other clock signal. Similarly, when the processor and memory clocks are in phase, the buff_rdy signal (FIG. 5) also may bypass the signal synchronizer.

Memory to Processor Queue (M2PQ)

Figure 5:
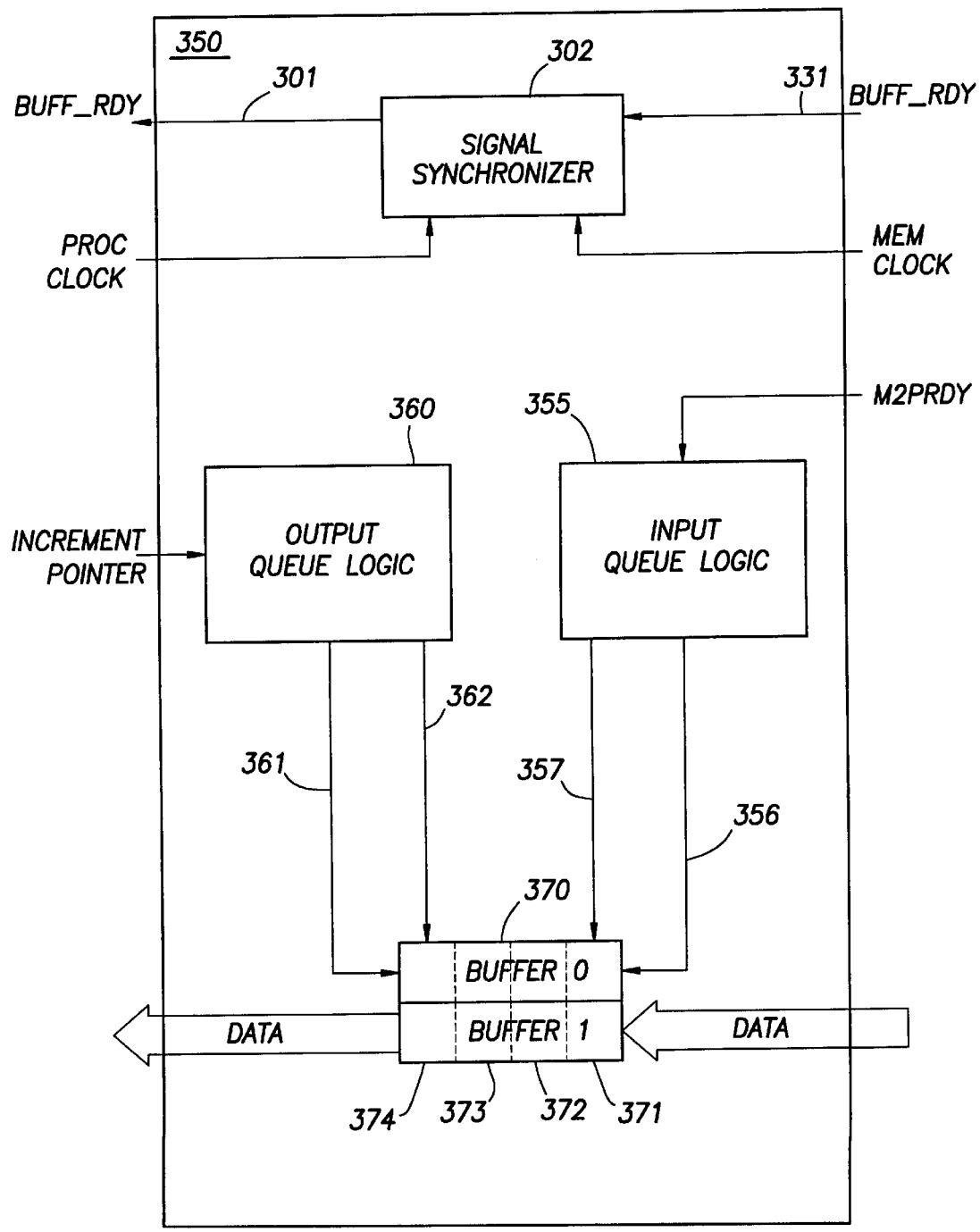
FIG. 5 is a block diagram illustrating in more detail the memory to processor data queue of FIG. 1.

Referring now to FIGS. 2 and 5, the memory to processor queue (M2PQ) 350 preferably includes input queue logic 355, output queue logic 360, queue read buffer 370, and signal synchronizer 302. Queue read buffer 370 preferably includes two data buffers, buffer 0 and buffer 1. Data read from the memory array to the system processor is preferably stored temporarily in one of the data buffers 0, 1 in queue read buffer 370. Data is placed in data buffers 0 and 1 by memory control 206 and read out by processor control 202.

Buffers 0, 1 in the queue read buffer 370 preferably include four segments, or queue words, 371, 372, 373, 374. Each segment preferably is 8 bytes wide and thus the buffers are 32 bytes wide. The input queue logic 355 receives an M2PRDY signal from memory control 206, and provides an input buffer pointer 356 and an input queue word pointer 357 to queue read buffer 370. The input buffer pointer 356 identifies the buffer, while the input queue word pointer 357 identifies the queue word in which data is placed by memory control 206. When memory control 206 provides data to queue read buffer 370, memory control 206 asserts the memory-to-processor ready (M2PRDY) signal to input queue logic 355. In response, the input queue logic 355 identifies the buffer and the buffer location where the data is to be stored. The buffer is identified by input buffer pointer 356. The input queue logic 355 increments the input queue word pointer 357 to identify the queue word in which the next word of data is to be driven by memory control 206. Once data for a transaction in a buffer has been received, the memory control 206 asserts a buffer ready (buff_rdy) signal to the signal synchronizer 302, which in turn transmits the buff_rdy signal to the processor control 202. The buff_rdy signal indicates to processor control 202 that a buffer is full and is ready to be read by the processor control 202.

Output queue logic 360 similarly provides an output buffer pointer 361 and an output queue word pointer 362 to enable processor control 202 to read the appropriate data from queue read buffer 370. Processor control 202 provides a pointer increment signal to output queue logic. Upon detection of an asserted buff_rdy signal, processor control 202 asserts the pointer increment signal. In response to the pointer increment signal, output queue logic increments output buffer pointer 361 to enable processor control 202 to read the first queue word of data from the appropriate buffer. Output queue logic 360 then increments the output queue word pointer 362 to enable processor control 202 to read subsequent queue words of data.

Memory to PCI and PCI to memory queues

Data reads and writes between devices on the PCI bus and SDRAM memory 114 (FIG. 2) use similar logic to that described above regarding processor to memory reads and writes. The PCI to memory queue (PCI2MQ) 400 preferably is constructed in similar fashion to the P2MQ 300 in FIG. 3 and the memory to PCI queue (M2PCIQ) 450 preferably is constructed in similar fashion to the M2PQ 350 in FIG. 5. One skilled in the art will understand that the PCI bus control 204 transmits and receives appropriate PCI protocol signals for interfacing with components residing on the PCI bus. To the extent signal synchronization is required (i.e., when the PCI clock and memory clocks are out of phase, a signal synchronizer 302 is used).

Programming SDRAM bank timing parameters

Referring again to FIG. 1, computer system 100 preferably allows communication with banks of SDRAM devices that require different clock frequencies, as well as other timing parameters. For memory and PCI bridge controller 200 to effectuate data writes to and reads from memory array 114, computer system 100 must determine which types of SDRAM devices are present in the system memory. The memory type information is supplied to memory and PCI bridge controller 202, which uses the information to drive an appropriate clock signal frequency to each bank of SDRAM 114 and to provide certain other timing parameters appropriate for each bank of memory chips.

Although various techniques for determining the type of SDRAM devices present in the system memory are possible, the computer system 100 preferably uses the Serial Presence Detect (SPD) information stored in the SDRAM array 114. The SPD standard defines various features of a memory device and stores that information permanently in the memory device. Those locations in the memory device containing the SPD information can be accessed through normal read cycles. In accordance with the preferred embodiment, computer system 100 retrieves the SPD information from all banks of memory 114 during system initialization and supplies that information to memory and PCI bridge controller 200 using the BIOS feature in the computer.

The SPD standard requires the following information to be implemented in all memory devices designed to the SPD standard.

TABLE I

SPD Content

| Description | Data Type | Address Map |
|---|---|---|
| SPD size | Look-up table (LUT) Entry | 0 |
| Total SPD memory size | LUT Entry | 1 |
| Fundamental memory type | LUT Entry | 2 |
| Definition of features specific to fundamental memory | | 3–31 |
| (Optional) Superset memory type | | 32 |
| (Optional) Definition of features specific to the superset memory | | 33–61 |
| SPD revision designator | LUT | 62 |
| Checksum for bytes 0–62 | Checksum | 63 |
| Manufacturer's Jedec IC code per JEP-106 | LUT | 64–71 |
| Manufacturing location | Supplier unique | 72 |
| Manufacturer's part number | Supplier unique | 73–90 |
| Revision code | Supplier unique | 91–92 |
| Manufacturing date | Binary coded decimal | 93–94 |
| Assembly serial number | Supplier unique | 95–98 |
| Manufacturer specific data | Supplier unique | 99–125 |
| Reserved | N/A | 126–127 |
| Open free-form area | Application specific | 128–255 |

Thus, computer system 100 can determine whether SDRAM devices are present by reading the second byte of SPD information (as shown in Table I above) corresponding to the fundamental memory type. According to the SPD standard, an SDRAM device is identified by an hexadecimal value in the second byte of SPD information. Further, by accessing other SPD information, such as the manufacturer's part number in bytes 73–90, computer system 100 can determine the specific type of SDRAM device present and thus, that circuit is preferred clock frequency and timing characteristics.

Figure 6:
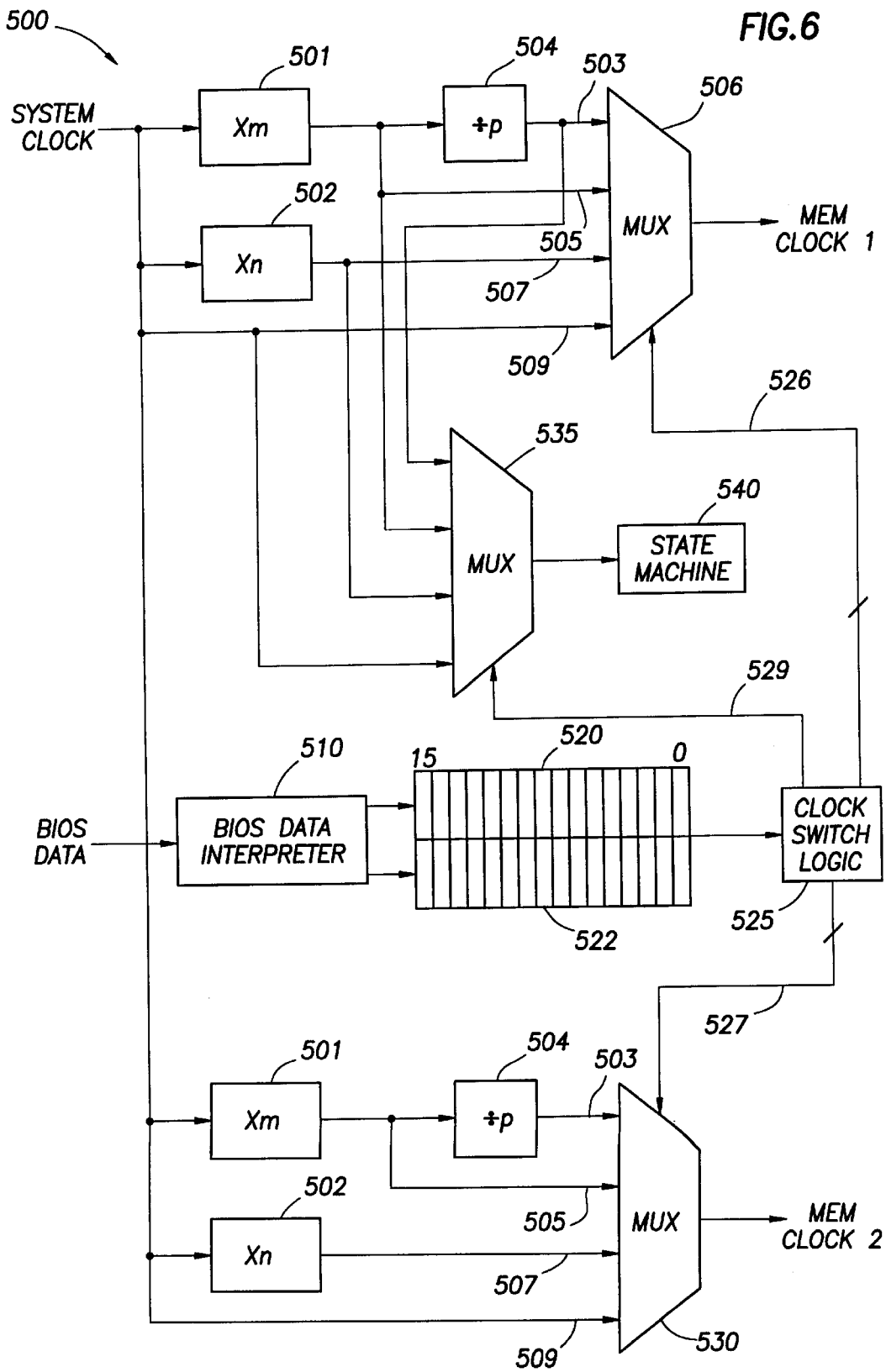
FIG. 6 is a block diagram of the memory clock generator of FIG. 1.

Referring now to FIGS. 2 and 6, memory clock generator 500 includes BIOS data interpreter 510, bank speed control register 520, and memory timing control register 522. Once the SPD information for the SDRAM banks is accessed during initialization, that information preferably is provided to memory and PCI bridge controller 200, and more specifically to memory clock generator 500 as BIOS data. As shown in FIG. 6, specific information for each bank of SDRAM devices preferably is provided to BIOS data interpreter 510.

The memory specific BIOS information is interpreted by BIOS data interpreter 510, which determines the appropriate memory clock frequency for the memory device and stores the clock frequency information in bank speed control register 520. The size of the bank speed control register 520 depends on the number of possible banks provided in computer system 100 and the number of different clock frequencies memory clock generator 500 may provide. As an example, bank speed control register 520 may be a sixteen bit register with two bits dedicated for speed control definition for eight memory banks. With two bits of bank speed control definition, one of four different memory clock frequencies can be selected. If more than four memory clock frequencies are available in computer system 100, bank speed control register 520 can be expanded to include additional bits of speed control information. Table II defines the four possible clock frequencies for each bank of SDRAM devices given two bits of speed control definition in bank speed control register 520.

TABLE II

Bank Speed Control Register

| Bits 15:14 | Bank 7 Speed Select |
| --- | --- |
| | 00 = memory speed 0 |
| | 01 = memory speed 1 |
| | 10 = memory speed 2 |
| | 11 = memory speed 3 |
| Bits 13:12 | Bank 6 Speed Select |
| | 00 = memory speed 0 |
| | 01 = memory speed 1 |
| | 10 = memory speed 2 |
| | 11 = memory speed 3 |
| Bits 11:10 | Bank 5 Speed Select |
| | 00 = memory speed 0 |
| | 01 = memory speed 1 |
| | 10 = memory speed 2 |
| | 11 = memory speed 3 |
| Bits 9:8 | Bank 4 Speed Select |
| | 00 = memory speed 0 |
| | 01 = memory speed 1 |
| | 10 = memory speed 2 |
| | 11 = memory speed 3 |
| Bits 7:6 | Bank 3 Speed Select |
| | 00 = memory speed 0 |
| | 01 = memory speed 1 |
| | 10 = memory speed 2 |
| | 11 = memory speed 3 |
| Bits 5:4 | Bank 2 Speed Select |
| | 00 = memory speed 0 |
| | 01 = memory speed 1 |
| | 10 = memory speed 2 |
| | 11 = memory speed 3 |
| Bits 3:2 | Bank 1 Speed Select |
| | 00 = memory speed 0 |
| | 01 = memory speed 1 |
| | 10 = memory speed 2 |
| | 11 = memory speed 3 |
| Bits 1:0 | Bank 0 Speed Select |
| | 00 = memory speed 0 |
| | 01 = memory speed 1 |
| | 10 = memory speed 2 |
| | 11 = memory speed 3 |

Each memory speed 0–3 can be any SDRAM clock frequency, such as 66 MHz, 100 MHz or any other appropriate SDRAM clock frequency. Referring still to FIG. 6, memory clock generator 500 preferably is provided with the system clock from which the clock generator derives SDRAM clock frequencies. A number of frequency multipliers 501, 502 and frequency dividers 504 are used in conjunction with multiplexers 506, 530 for selecting an appropriate clock frequency. The combination of multipliers and dividers shown in FIG. 6 is exemplary only and additional multipliers and/or dividers may be used depending upon the particular SDRAM frequencies that clock generator 500 must be capable of providing.

As shown, multipliers 501, 502 multiply the system clock frequency by a factor of n and m, respectively, where m and n may be any integer or fractional number. Similarly, dividers 504 divide their input frequency by any integer or fractional number p. Thus, the output frequency on line 503 from dividers 504 will be the system clock frequency multiplied by m and divided by p (i.e., system clock frequency x m/p). The selection of m, n, and p thus determines the available frequencies for the memory clock signals.

Clock signals with four different frequencies are provided as input signals on lines 503, 505, 507, 509 to multiplexers 506, 530. The frequency of the clock signal on line 503 is the system clock multiplied by m/p. The frequency of the clock signal on line 505 is the system clock multiplied by m. The frequency of the clock signal on line 507 is the system clock frequency multiplied by n. Finally, the system clock frequency is also provided as an input to multiplexers 506, 530 on line 509. If it desired to provide memory clock generator 500 with a capacity to generate additional clock signals, multiplexers 506, 530 will include additional inputs.

Clock switch control signals on lines 526, 527 determine which of the four input clock signals of multiplexers 506, 530 is to be provided as an output clock to the associated SDRAM bank. It should be recognized that for a 4:1 multiplexer (shown in FIG. 6), two control bits are required to determine the output signal. If multiplexers 506 include more than four input signals, then a higher number of control bits will be required. For example, an 8:1 multiplexer requires three switch control bits.

The clock switch control signals on lines 526, 527 are generated by clock switch logic 525 which produces the appropriate control signals as defined by bank control speed register 520. By reading the two speed control bits associated with each bank, clock switch logic 525 generates the appropriate switch control bits to direct each multiplexer 506 is provide a clock frequency corresponding to the speed control bits. In the preferred embodiment, the clock switch logic preferably is capable of selecting different frequencies for each multiplexer at any time.

Multiplexer 535 is configured similarly as multiplexers 506, 530 and is controlled by a signal on line 529 from control switch logic 525. The output clock frequency from multiplexer 535 is provided to a state machine 540, which controls the operation of memory and PCI bridge controller 200 consistent with the preferred embodiment. It should be recognized that the speed at which the state machine 540 must match the speed of each SDRAM as each SDRAM is accessed for read or write cycles. Accordingly, clock switch logic 525 sets control lines 529 to select the same clock frequency from multiplexer 535 as is selected by either multiplexer 506 or 530 for the current read or write cycle. For example, if a read cycle is pending for the SDRAM bank to which memory clock 1 is provided by multiplexer 506, then control switch logic 525 directs multiplexer 535 to provide that same clock frequency to state machine 540.

In addition to generating and selecting the appropriating memory clock frequency, other memory timing parameters must also be determined. BIOS data interpreter 510 determines these timing parameters based on the SPD BIOS information received and programs memory timing control register 522. Table III provides an exemplary memory timing control register bit definition. A separate memory timing register preferably is provided for each SDRAM bank, with each timing register providing timing specific information for that bank.

TABLE III

Memory Timing Control Register

| Bit Number | R/W | Bit Definition | Description |
| --- | --- | --- | --- |
| 15–14 | R/W | CAS Latency | Defines how many clocks after |
| | | 00 = 2 Clocks | the Read Command is issued |
| | | 01 = 3 Clocks | before the data will be driven by |
| | | 10 = 4 Clocks | the SDRAMs. |
| | | 11 = Not define | |
| 13–12 | R/W | Row Precharge | Defines how many clocks after |
| | | 00 = 2 Clocks | the Precharge Command is |
| | | 01 = 3 Clocks | issued before an Activate |
| | | 10 = 4 Clocks | Command can be done. |
| | | 11 = Not define | |
| 11–10 | R/W | ACT to Pre-charge Delay | Defines how long after an Activate Command is issued |
| | | 00 = 4 Clocks | that a Precharge Command can |
| | | 01 = 5 Clocks | be done. |
| | | 10 = 6 Clocks | |

TABLE III-continued

Memory Timing Control Register

| Bit Number | R/W | Bit Definition | Description |
|---|---|---|---|
| | | 11 = 7 Clocks | |
| 9 | R | Reserved | |
| 8 | R/W | Address Set Up<br>1 = 2 Clocks | This preferably is not programmable and is set to 2 clocks. |
| 7–6 | R/W | Refresh to Activate Delay<br>00 = 7 Clocks<br>01 = 8 Clocks<br>10 = 9 Clocks<br>11 = 10 Clocks | Defines how many clocks after a Refresh Command is issued before an Activate Command can be done. |
| 5 | R/W | ACT to R/W Delay<br>0 = 2 Clocks<br>1 = 3 Clocks | Defines the delay from an Activate Command to a Read or Write Command. Must be set to the largest delay of all the banks in the system. |
| 4 | R | Reserved | |
| 3 | R/W | Data to PRE Delay<br>0 = 1 Clocks<br>1 = 2 Clocks | Defines how long after the last data is written to the SDRAMs that a Precharge Command can be issued. |
| 2–0 | R | Reserved | |

Numerous variations and modifications will become apparent to those skilled in the art once the above disclosure is fully appreciated. It is intended that the following claims be interpreted to embrace all such variations and modifications.

We claim:

1. A computer system including:

a processor;

a memory array, including at least two banks of SDRAM memory;

a memory controller coupled to said processor via a host bus including:

a first data queue for buffering data transferred between each of said SDRAM memory banks and said processor, wherein said first data queue temporarily stores data during write cycles from said processor to said at least one SDRAM memory bank; and a second data queue for buffering data signals during read cycles from said SDRAM memory to said processor;

wherein said memory controller generates a first clock signal that is provided to a first SDRAM memory bank and said memory controller generates a second clock signal that is provided to a second SDRAM memory bank.

2. The computer system of claim 1, wherein said memory controller includes a memory clock generator for generating said first and second clock signals.

3. The computer system of claim 2 wherein each of said first and said second data queues includes a signal synchronizer for synchronizing signals between said first and said second clock signals.

4. The computer system of claim 1 wherein said first clock signal operates at a first frequency and said second clock signal operates at a second frequency that is different than said first frequency.

5. A computer system including:

a processor;

a memory array including at least two banks of SDRAM memory, said at least two banks of SDRAM memory including a first SDRAM memory bank and a second SDRAM memory bank;

a memory controller coupled to said processor via a host bus, said memory controller including:

a memory clock generator for generating a first clock signal and a second clock signal, wherein said first clock signal is provided to said first SDRAM memory bank and said second clock signal is provided to said second SDRAM memory bank;

a first data queue for buffering data transferred between each of said SDRAM memory banks and said processor, wherein said first data queue temporarily stores data during write cycles from said processor to said SDRAM memory banks;

a second data queue for buffering data signals during read cycles from said SDRAM memory to said processor; and a signal synchronizer for synchronizing signals between said first and said second clock signals, said signal synchronizer coupled to said first and second data queues, wherein said signal synchronizer comprises two flip flops that are sequentially connected.

6. The computer system of claim 5 wherein said flip flops are both clocked by a processor bus clock signal.

7. The computer system of claim 5 wherein said flip flops are both clocked by a memory clock signal.

8. The computer system of claim 5 wherein said first data queue includes a plurality of write buffers for storing write data from said processor and said write data is stored in said write buffers using a system clock signal.

9. The computer system of claim 8 wherein said write data is written from said write buffers to said SDRAM using a memory clock signal.

10. The computer system of claim 9 wherein said first data queue includes input queue logic and output queue logic, said input queue logic including an input pointer to said write buffers and said output queue logic including an output queue pointer to said write buffers.

11. The computer system of claim 10 wherein said input queue logic includes a buffer status bit associated with each write buffer, said buffer status bit indicating whether write data in the associated buffer has been written to SDRAM memory.

12. The computer system of claim 11 wherein said output queue logic includes a valid bit associated with each write buffer, said valid bit indicating whether write data in the associated buffer has been written to SDRAM memory.

13. The computer system of claim 12 wherein said second data queue includes a plurality of read buffers for storing the read data and the read data is stored in the read buffers using said memory clock signal and the read data stored in the read buffers is extracted from the read buffers and provided to said processor using the system clock signal.

14. The computer system of claim 13 wherein said second data queue includes a pointer to said read buffers, said pointer is incremented upon receipt of an asserted memory ready signal by said second data queue.

15. A computer system including:

a processor, said processor operation synchronized with a processor bus clock signal;

at least one bank of SDRAM memory operating based upon a memory clock signal; and a memory controller coupled to said processor via a host bus including:

a first data queue for buffering data transferred between said at least one SDRAM memory bank and said processor, wherein said first data queue temporarily stores data during write cycles from said processor to said at least one SDRAM memory bank; and a second data queue for buffering data signals during read cycles from said at least one SDRAM memory to said processor;

a memory clock generator that receives a system clock signal and generates the memory clock signal.

16. The computer system of claim 15 wherein a plurality of SDRAM memory banks are provided and said memory clock generator includes a multiplexer coupled to each bank of SDRAM memory, said multiplexer selecting from a plurality of possible memory clock signals to provide to each bank of SDRAM memory.

17. The computer system of claim 16, wherein said memory clock generator includes a bank speed control register and a memory timing control register.

18. The computer system of 17 wherein serial presence detect information associated with each bank of SDRAM memory is stored in each SDRAM memory bank and said memory clock generator includes a data interpreter for receiving said serial presence detect information from each SDRAM memory bank and said data interpreter stores values representative of speed in said bank speed control register and timing parameters in said memory timing control register.

19. The computer system of claim 18 wherein said multiplexer is controlled by a clock switch control signal, wherein the state of said clock switch control signal is determined by said values representative of speed stored in said bank speed control register.

20. A computer system including:

a processor;

a memory array including at least two banks of SDRAM memory; and a memory controller coupled to said processor and said memory array, including:
  a processor control circuit providing a processor bus clock signal;
  a memory control circuit providing a memory clock signal; and
  a data queue buffer receiving said processor bus clock signal and said memory clock signal and transferring data to said processor control circuit synchronized with said processor bus clock signal, and transferring data to said memory control that is synchronized with said memory clock signal.

21. The computer system of claim 20 wherein said memory controller includes a memory clock generator for generating multiple memory clock signals selectively used in association with said SDRAM memory banks.

22. The computer system of claim 21 wherein said data queue buffer temporarily stores data during write cycles from said processor to said SDRAM memory.

23. The computer system of claim 21 wherein said data queue buffer temporarily stores data during read cycles from said SDRAM memory to said processor.

24. The computer system of claim 23 wherein said multiple clock signals have different frequencies.

25. The computer system of claim 24 wherein a first SDRAM memory bank operates based upon a clock signal with a first frequency and a second SDRAM memory bank operates with a clock signal with a second frequency.

26. The computer system of claim 25 wherein said data queue buffer includes a signal synchronizer for synchronizing signals between said processor bus clock and said memory clock.

27. A computer system including:

a processor;

a memory controller coupled to said processor by a host bus, said memory controller including:
  a memory clock generator for generating multiple memory clock signals having different frequencies; and
  a processor control circuit providing a processor bus clock signal;

a memory array coupled to said memory controller, including:
  at least two banks of memory, including:
    a first SDRAM memory bank that operates based upon a clock signal with a first frequency; and
    a second SDRAM memory bank that operates based upon a clock signal with a second frequency;
  wherein said multiple clock signals are selectively used in association with said banks;

a memory control circuit providing a memory clock signal;

a data queue buffer that receives said processor bus clock signal and said memory clock signal, transfers data to said processor control synchronized with said processor bus clock signal, transfers data to said memory controller synchronized with said memory clock signal, and temporarily stores data during read cycles from said SDRAM memory to said processor; and a signal synchronizer for synchronizing signals between said processor bus clock and said memory clock, wherein said signal synchronizer includes two flip flops that are serially connected.

28. The computer system of claim 27 wherein said flip flops are both clocked by said processor bus clock signal.

29. The computer system of claim 27 wherein said flip flops are both clocked by said memory clock signal.

30. The computer system of claim 27 wherein said data queue buffer includes a plurality of write buffers for storing data from said processor and said data is stored in said write buffers using said system clock signal.

31. The computer system of claim 30 wherein said data is written from said write buffers to said SDRAM using said memory clock signal.

32. The computer system of claim 31 wherein said data queue buffer includes input queue logic and output queue logic, said input queue logic including an input pointer to said write buffers and said output queue logic including an output queue pointer to said write buffers.

33. The computer system of claim 32 wherein said input queue logic includes a buffer status bit associated with each write buffer, said buffer status bit indicating whether write data in said associated buffer has been written to said SDRAM memory.

34. The computer system of claim 33 wherein said output queue logic includes a valid bit associated with each write buffer, said valid bit indicating whether write data in said associated buffer has been written to said SDRAM memory.

35. The computer system of claim 27 wherein said data queue buffer includes a plurality of read buffers for storing data from said SDRAM memory and the read data is stored in said read buffers using said memory clock signal and the read data stored in said read buffers is extracted from said read buffers and provided to said processor using said system clock signal.

36. The computer system of claim 35 wherein said second data queue includes a pointer to said read buffers, said pointer is incremented upon receipt of an asserted memory ready signal by said second data queue.

37. A computer system including:

a processor;

a graphics card coupled to said processor;

a memory array including at least two banks of SDRAM memory, said at least two banks of SDRAM memory including a first SDRAM memory bank and a second SDRAM memory bank;

a memory controller coupled to said processor via a host bus, said memory controller including:

a memory clock generator for generating a first clock signal and a second clock signal, wherein said first clock signal is provided to said first SDRAM memory bank and said second clock signal is provided to said second SDRAM memory bank;

a first data queue for buffering data transferred between each of said SDRAM memory banks and said processor, including:

a plurality of write buffers for storing write data from said processor during write cycles from said processor to said SDRAM memory banks using a memory clock signal;

input queue logic that includes an input pointer to said write buffers and a buffer status bit associated with each write buffer, said buffer status bit indicating whether write data in the associated buffer has been written to SDRAM memory;

output queue logic that includes an output queue pointer to said write buffers and a valid bit associated with each write buffer, said valid bit indicating whether write data in the associated buffer has been written to SDRAM memory;

a second data queue for buffering data signals during read cycles from said SDRAM memory to said processor, including;

a plurality of read buffers for storing the read data, wherein the read data is stored in the read buffers using said memory clock signal, and wherein the read data stored in the read buffers is extracted from the read buffers and provided to said processor using the system clock signal; and a pointer to said read buffers, wherein said pointer is incremented upon receipt of an asserted memory ready signal by said second data queue; and a signal synchronizer for synchronizing signals between said first and said second clock signals, said signal synchronizer coupled to said first and second data queues, wherein said signal synchronizer comprises two flip flops that are sequentially connected and clocked by a processor bus clock signal.

* * * * *